United States Patent
Syska et al.

[11] Patent Number: 5,269,679
[45] Date of Patent: Dec. 14, 1993

[54] STAGED AIR, RECIRCULATING FLUE GAS LOW NO$_x$ BURNER

[75] Inventors: Andrew J. Syska, Marblehead; János M. Beér, Winchester, both of Mass.; Majed A. Togan, Avon, Conn.; Donald P. Moreland, Hershey, Pa.; Charles E. Benson, Windham, Conn.

[73] Assignees: Gas Research Institute, Chicago, Ill.; Massachusetts Institute of Technology, Cambridge, Mass.

[21] Appl. No.: 964,550

[22] Filed: Oct. 16, 1992

[51] Int. Cl.$^5$ .............................................. F23M 3/00
[52] U.S. Cl. ............................................ 431/9; 431/115
[58] Field of Search ........................... 431/9, 115, 116

[56] References Cited

U.S. PATENT DOCUMENTS

| | | |
|---|---|---|
| 1,342,901 | 6/1920 | Good . |
| 1,911,177 | 5/1933 | Beck . |
| 2,002,448 | 5/1935 | Dodge . |
| 3,097,686 | 7/1963 | Morrow . |
| 3,730,668 | 5/1973 | Iida et al. .................... 431/10 |
| 3,868,211 | 2/1975 | Haye et al. ................. 431/10 |
| 3,890,088 | 6/1975 | Ferri .......................... 431/351 |
| 3,990,831 | 11/1976 | Syska ............................ 431/9 |
| 4,007,001 | 2/1977 | Schirmer et al. ............ 431/10 |
| 4,007,002 | 2/1977 | Schirmer .................... 431/10 |
| 4,021,188 | 5/1977 | Yamagishi et al. ......... 431/158 |
| 4,083,677 | 4/1978 | Hovis .......................... 432/19 |
| 4,445,842 | 5/1984 | Syska ......................... 431/115 |
| 4,500,281 | 2/1985 | Beardmore ................... 431/3 |
| 4,504,211 | 3/1985 | Beardmore ................... 431/3 |
| 4,629,413 | 12/1986 | Michelson et al. ........... 431/9 |
| 4,797,087 | 1/1989 | Gitman ....................... 431/10 |
| 4,800,866 | 1/1989 | Finke ........................ 126/91 A |
| 4,828,483 | 5/1989 | Finke ......................... 431/11 |
| 4,900,246 | 2/1990 | Schirmer et al. .......... 431/352 |
| 4,942,832 | 7/1990 | Finke ......................... 110/190 |
| 4,995,807 | 2/1991 | Rampley et al. .............. 431/9 |
| 5,015,174 | 5/1991 | Dreizler et al. ........... 431/116 |
| 5,044,931 | 9/1991 | Van Eerden et al. ......... 431/8 |
| 5,044,932 | 9/1991 | Martin et al. ............. 431/116 |
| 5,092,761 | 3/1992 | Dinicolantonio ........... 431/115 |
| 5,131,838 | 7/1992 | Gensier et al. ............. 431/177 |

Primary Examiner—Carroll B. Dority
Attorney, Agent, or Firm—Weingarten, Schurgin, Gagnebin & Hayes

[57] ABSTRACT

A gas-fired burner incorporating an air driven jet pump for mixing air, fuel, and recirculated flue gas is disclosed. The burner is configured for the staged introduction of combustion air to provide a fuel-rich combustion zone and a fuel-lean combustion zone. The burner achieves reduced NO$_x$ emission levels in high temperature applications which use preheated combustion air.

31 Claims, 10 Drawing Sheets

STAGED AIR, RECIRCULATING FLUE GAS LOW NO$_x$ BURNER

FIELD OF THE INVENTION

This invention relates to the field of gas-fired burners for furnaces and boilers and more particularly to burners for reducing NO$_x$ emission levels from combustion occurring in furnaces and boilers.

BACKGROUND OF THE INVENTION

Combustion processes which burn fossil fuels introduce emissions into the atmosphere which have been linked with harmful effects. Environmental regulations have been enacted to limit the concentrations of these emissions in the exhaust gases from combustion processes. Such emissions include nitrogen oxides or NO$_x$, primarily NO and NO$_2$. Preferably, NO$_x$ emission levels should be significantly below 100 parts per million (ppm).

NO$_x$ emissions arise from nitrogen present in the combustion air and from fuel-bound nitrogen in coal or fuel oil if such fuels are burned. Conversion of fuel-bound nitrogen to NO$_x$ depends on the amount and reactivity of the nitrogen compounds in the fuel and the amount of oxygen in the combustion zone. Conversion of fuel-bound nitrogen is not present in processes using fuels such as natural gas, which contain no fixed nitrogen compounds.

Conversion of atmospheric nitrogen, N$_2$, present in the combustion air to NO$_x$ (thermal NO$_x$) is temperature dependent. In general, the greater the flame temperature in the combustion zone, the greater the resultant No$_x$ content in the emissions. NO$_x$ conversion increases drastically at temperatures greater than 1800 K. if O$_2$ is present.

Many industrial processes, such as forging, reheating, and melting of glass or aluminum, are carried out in high temperature, gas-fired furnaces. In such high temperature processes, air used in the combustion process is frequently preheated. Preheating the air reduces the amount of fuel needed, increasing thermal efficiency, but increases the temperature of the flame, which increases NO$_x$ content. Thus, a higher temperature burner which is capable of reducing NO$_x$ emissions without sacrificing thermal efficiency is needed.

One way of reducing NO$_x$ content which has been effective in processes using nitrogen bearing fuels is to create a fuel-rich combustion zone followed by a fuel-lean combustion zone. This can be achieved by staging the introduction of air into the combustion chamber. The fuel-rich zone contains less than the theoretical or stoichiometric amount of oxygen. Thus, less oxygen is available to convert the nitrogen to NO$_x$.

Recirculating flue gas into the flame is another technique to limit NO$_x$ emissions. The recirculated flue gas reduces the oxygen concentration in the reactants and reduces the flame temperature by cooling the combustion products, thereby lowering NO$_x$ content. Additionally, NO$_x$ present in the recirculated flue gas can be further destroyed by reburning. The flue gases can also be used for other purposes, such as preheating the combustion air or vaporizing liquid fuels.

Burners which are particularly suitable for high temperature processes are disclosed in U.S. Pat. Nos. 4,445,842 and 3,990,831. These burners incorporate an air driven jet pump for inducting flue gas into the air stream and to improve the mixing of the fuel, air, and flue gas. These burners also recirculate flue gases into the fuel/air mixture, which reduces NO$_x$ emissions.

SUMMARY OF THE INVENTION

Because the total air supply to the burner is generally limited, dividing the air stream into primary and secondary air streams reduces the primary air available to drive the jet pump in burners in which jet pumps are used. Dividing the air stream also limits the jet pump capacity for recirculating large values of flue gas through the burner. In the present invention, a low NO$_x$, natural gas-fired burner for high temperature applications incorporating an air driven jet pump has been configured and optimized for the staged introduction of combustion air. The burner comprises an air driven jet pump for mixing air, fuel, and recirculated flue gas and for forcing the mixture into the combustion chamber. The burner includes an air inlet port which connects with a primary air passage for supplying combustion air to the jet pump and to provide a fuel-rich combustion zone. The burner further includes a secondary air passage to provide a fuel-lean combustion zone downstream of the fuel-rich zone.

DESCRIPTION OF THE DRAWINGS

The invention will be more fully understood from the following detailed description taken in conjunction with the accompanying drawings in which.

DETAILED DESCRIPTION OF THE INVENTION

Figure 1:
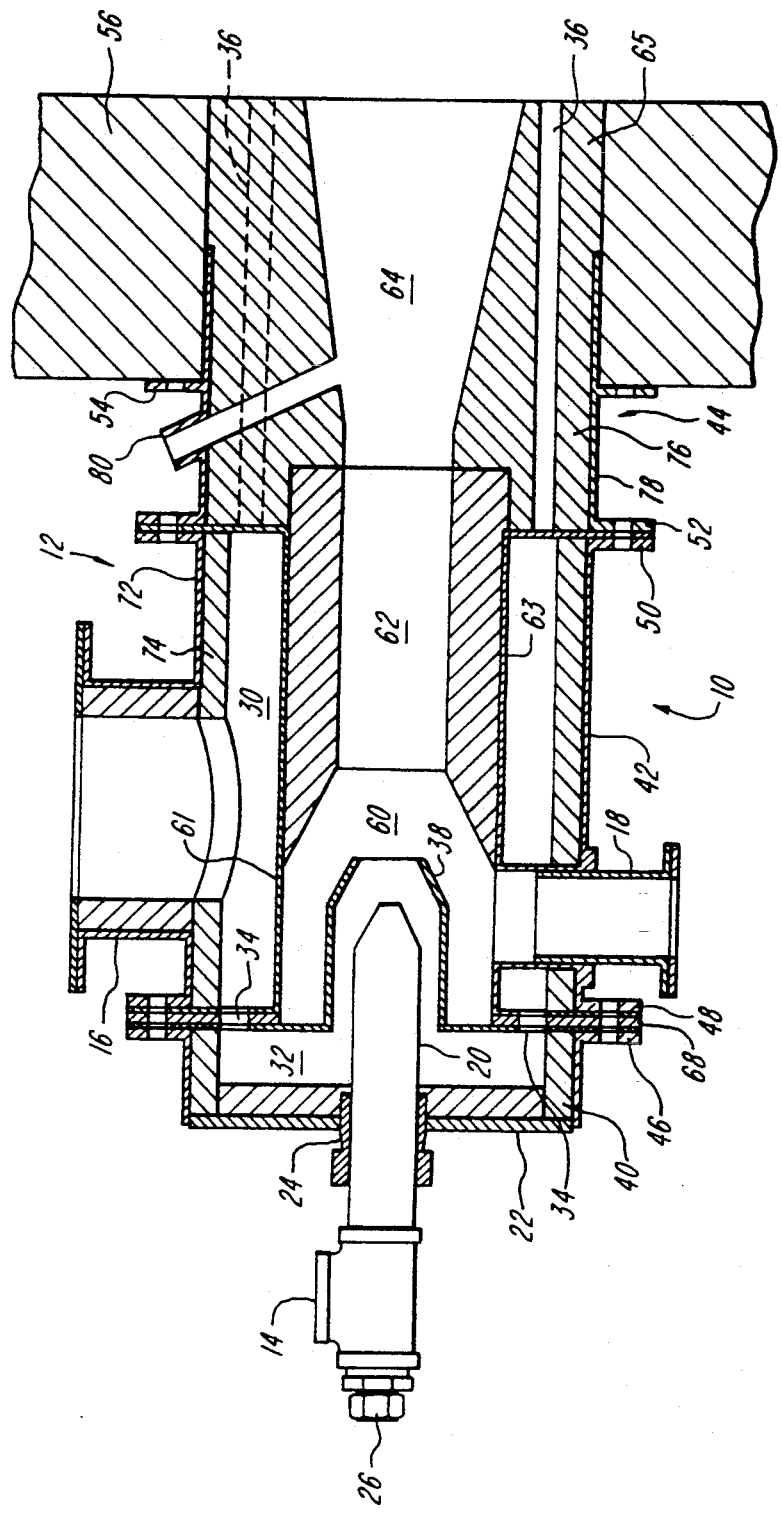
FIG. 1 is a cross-sectional view of a burner according to the present invention.
Figure 2:
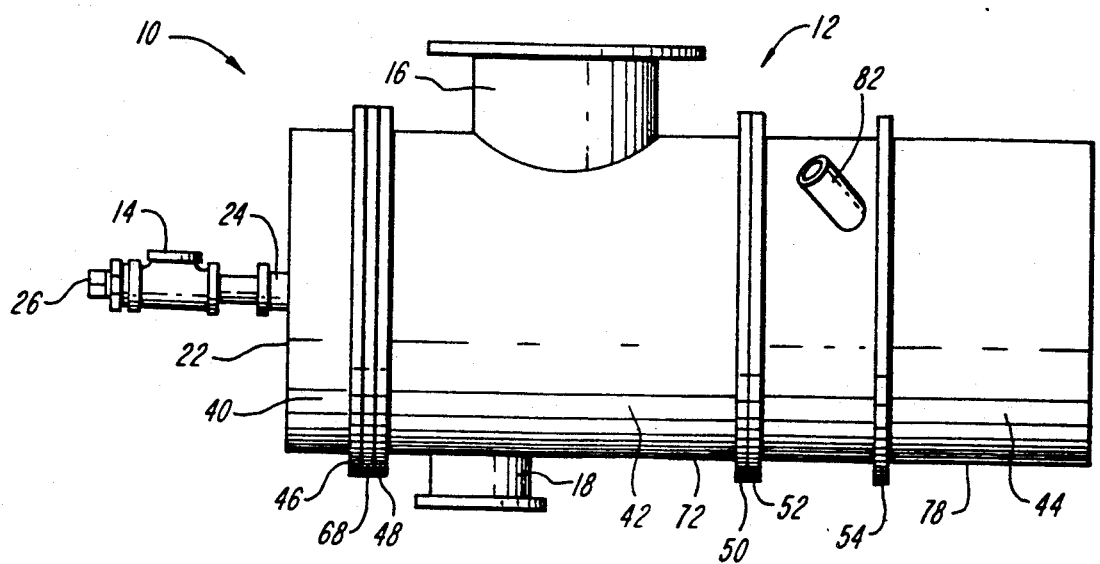
FIG. 2 is a side view of the burner of FIG. 1.

A burner according to the preferred embodiment of the present invention is shown generally at 10 in FIGS. 1 and 2. The burner 10 comprises a housing 12, a gaseous fuel connection 14, an air inlet connection 16, and a recirculating flue gas connection 18. A fuel inlet nozzle 20 extends from the fuel connection 14 into the housing 12 through an opening in the housing end wall 22. A fitting 24 is provided to seal the opening. An observation port 26 is provided at the fuel connection 14. The air inlet 16 communicates with an annular air chamber 30. The air chamber communicates through annularly spaced openings 34 with primary air passage 32 and air nozzle 38. The air chamber 30 also communicates with a plurality of annularly spaced axial secondary air passages 36.

The housing 12 comprises three sections: end section 40, mid section 42, and jet pump body 44. The jet pump body 44 comprises a suction chamber portion 61, a mixing chamber portion 63, and a burner block or quarl 65. A frustoconical suction chamber 60 is provided in the suction chamber portion 61. A cylindrical mixing chamber 62 is provided in the mixing chamber portion 63. A frustoconical diffuser 64 is provided in the burner block 65. The diffuser 64 also serves as a combustion chamber, to be more fully described below.

The end and mid sections 40, 42 are interconnected by bolted annular flanges 46, 48. The mid section 42 and jet pump body 44 are interconnected by bolted flanges 50, 52. An annular flange 54 is provided on jet pump body 44 for interconnection to a furnace wall 56, shown in FIG. 1. The jet pump body 44 is interconnected to both the end section 4 and the mid section 42 by annular flange 68 between flanges 46 and 48. The primary air openings 34 are provided in the annular flange 68. The end and mid sections and the jet pump body may also be interconnected in any other suitable manner. Similarly, the burner housing may be connected to the furnace in any other suitable manner.

Figure 3:
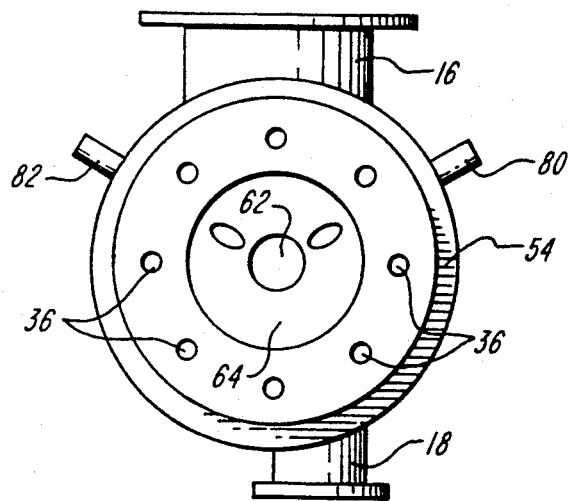
FIG. 3 is an end view of the burner of FIGS. 1 and 2.

The end section 40 and mid section 42 are preferably fabricated from carbon steel 72 and lined with insulating castable material 74. The jet pump body 44 is preferably fabricated from a high temperature dense refractory material 76 and an outer casing 78 of steel or cast iron. A pilot light opening 80 and a scanner opening 82 (shown in FIG. 3) are formed in the refractory material 76 surrounding the diffuser 64.

In operation, air is forced under pressure through air inlet 16 into the annular chamber 30. For high temperature applications, the air has generally been preheated to improve furnace process efficiency. The air stream divides in the annular chamber 30 into two streams, a primary air stream and a secondary air stream. The primary air stream enters through the openings 34 into the primary air passage 32. The passage 32 communicates via nozzle 38 with suction chamber 60. Air flowing through the nozzle 38 experiences a pressure drop. Natural gas fuel, entering through nozzle 20, concentric with air nozzle 38, also experiences a pressure drop. In flowing through the nozzle 38 and suction chamber 60, the lower pressure air and natural gas fuel cause flue gas, entering through inlet 18, to be drawn into the suction chamber. Preferably, the flue gas inlet 18 is connected tangentially to the housing mid section 42 to impart a spiral motion to the flue gas stream as it enters the primary air/fuel stream, which aids in maintaining flame stability.

The primary air and natural gas stream flows through the suction chamber 60 into the mixing chamber 62. The primary air, fuel, and flue gas mix in the mixing chamber 62. The mixture generally recovers some pressure in the mixing chamber and exits the mixing chamber 62 at a slightly increased pressure. The mixed primary air, fuel, and flue gas then enter the diffuser 64 which has an increasing cross sectional area, by virtue of the frustoconical shape, to decrease the velocity and increase the pressure up to the pressure in the furnace. However, if the included angle of the diffuser becomes too large, the flow will break away into eddies, rather than expand. An included angle of approximately 18° has been found to be suitable.

A pilot flame provided through tube 80 ignites the air and fuel mixture in the diffuser 64. The combustion can be observed through the scanner tube 82. The secondary air stream enters the plurality of annularly spaced passages 36 from the air chamber 30 and passes through to the furnace, where it enters the periphery of the flame envelope, which extends from the diffuser into the furnace. Thus, due to the division of the combustion air, a fuel-rich primary combustion zone exists in the flame in and immediately outside the diffuser, which receives less than the theoretical amount of air, and a fuel-lean secondary combustion zone exists in the flame which extends into the furnace. The flame in and immediately outside the diffusing section 64 may also be described as the primary flame, the flame in the furnace as the secondary flame.

In fuel-rich hydrocarbon flames, the source of NO is the fixation of $N_2$ by hydrocarbon fragments, in reactions such as:

$$CH + N_2 \rightarrow HCN + N$$

$$CH_2 + N_2 \rightarrow HCN + NH$$

N from the first reaction can then participate in the following fast reaction:

$$N + OH \rightarrow NO + H$$

The products HCN and NH will be partially converted in the fuel-rich flame to molecular nitrogen, $N_2$, provided that the temperature is at least 1400 K. and there is sufficient residence time for these reactions to go to completion. The NO formed by the reaction of $N_2$ with hydrocarbon radicals or introduced with the flue gases can also be converted back to $N_2$ through a "reburn" route in the fuel-rich flame. This process is initiated by reactions producing HCN, for example, $$CH + NO \rightarrow HCN + O.$$

The HCN further reacts to form $N_2$ at a rate that is dependent upon the fuel equivalence ratio and the temperature of the fuel-rich flame zone.

Under lean conditions, NO is formed primarily by the Zeldovich mechanism. Thus, reducing flame temperature in the lean stage effectively controls the NO formation rate. Flame temperature is reduced through the recirculated flue gases which introduce inert substances into the combustion zone which absorb a fraction of the energy as combustion products are heated from their initial temperature. The flue gases introduce principally $N_2$, $H_2O$, and $CO_2$ into the combustion zone. All of these species absorb energy while being reheated to flame temperature. The process may be even more effective if some of the molecules of $CO_2$ and $H_2O$ dissociate as they are heated to high temperatures.

For most flue gas recirculation applications, the amount of combustion products that can be recycled is limited by the need to preserve flame stability. However, the jet pump configuration of the burner of the present invention introduces the fuel and primary air into the fuel-rich zone in a manner that extends the amount of recyclable flue gas which can be introduced before flame instability occurs. In the present invention, flue gas recirculation is limited by the capacity of the jet pump more so than flame stability.

In the fuel-lean zone, thermal NO formation is also reduced by the introduction of the secondary air jets from the secondary air passages 36. The combustible products of the fuel-rich flame are intercepted in the furnace by the secondary air jets, which entrain burned and cooled combustion products before they mix with the products of the fuel-rich flame and burn as a secondary flame. In this mode of combustion, the peak temperature of the flame and the $O_2$ concentration are reduced, resulting in reduced thermal $NO_x$ formation.

Actual burner geometry and process parameters for a burner according to the present invention depend on the particular application. The predetermined input or design parameters include the percent excess combustion air, fraction of primary air, and percent of recirculated flue gas. The furnace conditions will determine the diffuser exit velocity and pressure. Both of these parameters affect the pressure drop through the primary air nozzle. Other parameters determined by the application are the combustion air temperature, the flue gas temperature, and the fuel gas flow and temperature.

Important process and burner geometry parameters which are determined by the input parameters include the pressure drops through and diameters of the primary and secondary air nozzles and fuel nozzle and the diameter of the mixing chamber. The pressure drops through the primary air nozzle and the gas fuel nozzle affect the ability of the jet pump to pull in the fuel and flue gas. The greater the pressure drop through the air nozzle 38, the greater the suction created for pulling in the fuel and flue gas. Reducing the pressure drop through the air nozzle reduces the suction, which reduces the ability to pull in the fuel and flue gas. With higher flue gas recirculation rates, a greater pressure drop is required. However, the supply of air is generally fixed. If the combustion air is staged into primary and secondary air flows, the amount of primary air is reduced, which reduces the pressure drop and the amount of flue gas which can be pulled in. Thus, the effectiveness of the jet pump is reduced. In general, if the primary air is less than about 40 percent of the total combustion air, it is difficult to drive the jet pump. Therefore, the primary air nozzle diameter and mixing chamber must be carefully sized to optimize the efficiency of the jet pump based upon the predetermined primary air fraction, percent of flue gas recirculation, and furnace conditions. The primary air nozzle diameter is generally sized to provide a pressure drop of 6 to 40 inches of water column, depending on the primary air flow and the amount of flue gas recirculation desired. Typically, the pressure drop will range between 4 and 24 inches of water column; in some applications, the pressure in the furnace is above atmospheric pressure, and the pressure drop through the primary air nozzle accordingly needs to be greater.

The individual diameters and the radial spacing of the secondary air passages 36 are also important parameters. Typically, the passage exits are sized to produce a secondary air exit velocity between 50 and 300 actual feet per second and preferably between 150 and 200 actual feet per second. The closer the radial spacing of the secondary air passages is to the exit diameter of the diffuser 64, the more effective the penetration of the secondary air jets into the secondary flame becomes and the lower the $NO_x$ emissions. Similarly, while a single secondary air passage could be provided if desired, a plurality of such passages spaced circumferentially about the diffuser is preferable. Typically, the radial displacement of the secondary air passages ranges from 1.2 to 1.5 of the exit radius of the diffuser.

Figure 10:
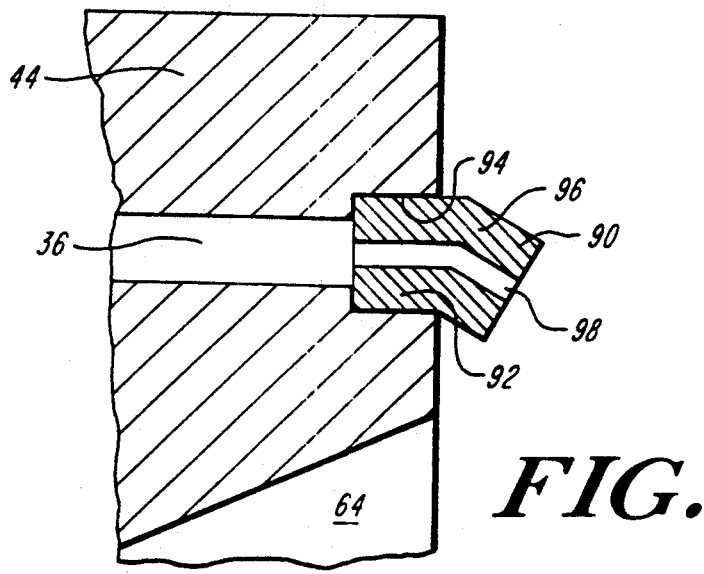
FIG. 10 shows a fragmentary cross-sectional view of an alternative embodiment of a nozzle insert according to the present invention.

Additionally, the angle of the exits of passages 36 to the burner longitudinal axis is important. The closer to 90 degrees to the burner axis, the more effective the secondary air. However, it is impractical to fabricate the exits at a large angle to the burner axis. Thus, a further embodiment of the present invention, shown in FIG. 10, contemplates nozzle inserts, which impart an angle between 0° and 90°. The inserts comprise a first portion 92 which fits into the ends 94 of passages 36, which may be widened to better receive the inserts. The inserts further comprise a second portion 96 which extends into the furnace, preferably angled toward the burner axis. An angled passage 98 is provided in the insert to communicate with passage 36 and the furnace. The passages 98 are also angled toward the burner axis. In this manner, the secondary air stream passing through passage 36 is directed at an angle toward the flame envelope.

A 2.5 million BTU/hr test burner according to the present invention was built and operated. Fifty-two burner operating conditions were investigated. Parameters which were varied included the combustion air and recirculated flue gas temperatures, the percent primary and secondary air, and percent flue gas recirculation into the primary and secondary air streams. Intrusive probes were used to measure flame characteristics.

With combustion air at 800° C., $NO_x$ emissions below 100 ppm were achieved with flue gas recirculation rates between 10 and 40%, and $NO_x$ emissions below 40 ppm were achieved with flue gas recirculation rates above 40%. Test results are shown in FIGS. 4, 5, and 6.

Figure 4:
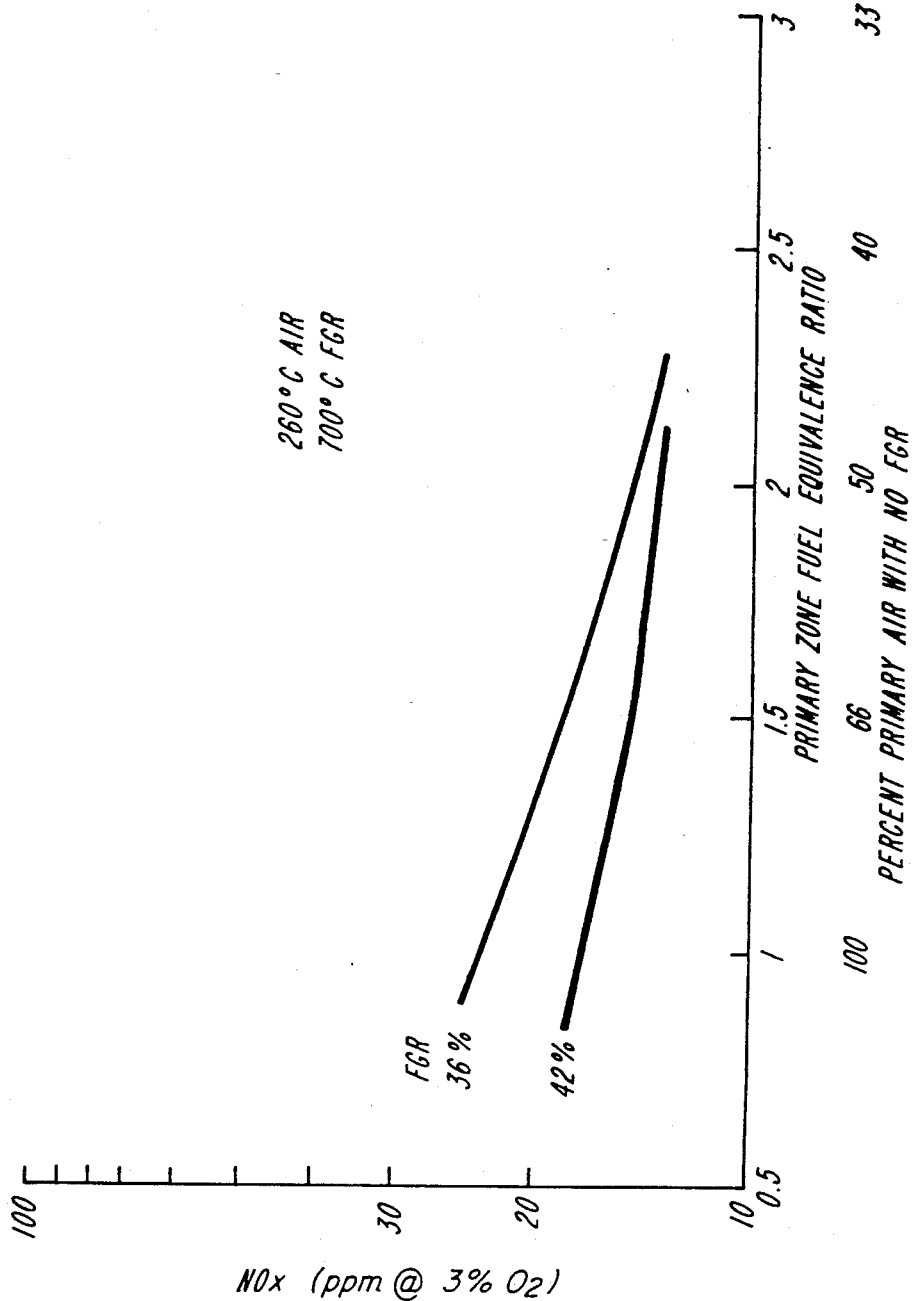
FIG. 4 is a graph of NO$_x$ emissions vs. primary zone fuel equivalence ratio for a burner according to the present invention using combustion air at 260° C. and flue gas at 700° C.

FIG. 4 is a graph of $NO_x$ emissions vs. primary zone fuel equivalence ratio, $\Phi$, for a burner according to the present invention using combustion air at 260° C. and flue gas at 700° C. The fuel equivalence ratio, $\Phi$, is the ratio of stoichiometric $O_2$ to $O_2$ supplied. The approximate percent of primary air supplied, assuming no oxygen in the recirculated flue gas, is also indicated on FIG. 4, superimposed on the $\Phi$ axis, to indicate the relation therebetween. Thus, at $\Phi = 1.0$, 100% of the combustion air was directed through the jet pump and none into the furnace. That is, all of the combustion air constituted primary air. At $\Phi = 1.51$, 66% of the combustion air was primary air and 34% of the combustion air was secondary air.

Two curves are shown on FIG. 4, one for tests done with 36% of the flue gas recirculated, and one with 42% flue gas recirculation. For both flue gas recirculation rates, $NO_x$ emissions of less than 30 ppm at 3% $O_2$ and in many cases less than 20 ppm were achieved.

Figure 5:
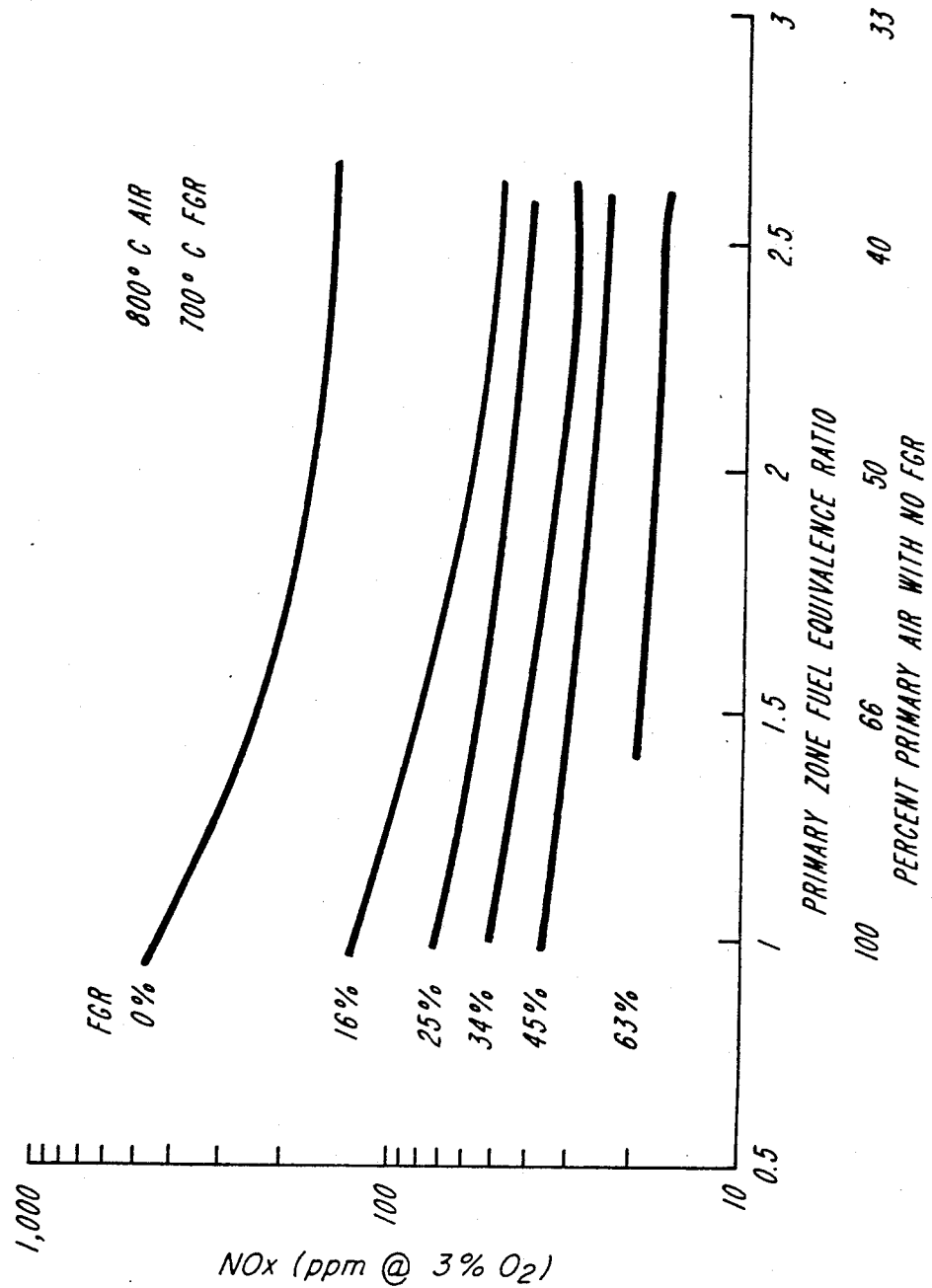
FIG. 5 is a graph of NO$_x$ emissions vs. primary zone fuel equivalence ratio for a burner according to the present invention using combustion air at 800° C. and flue gas at 700° C.
Figure 6:
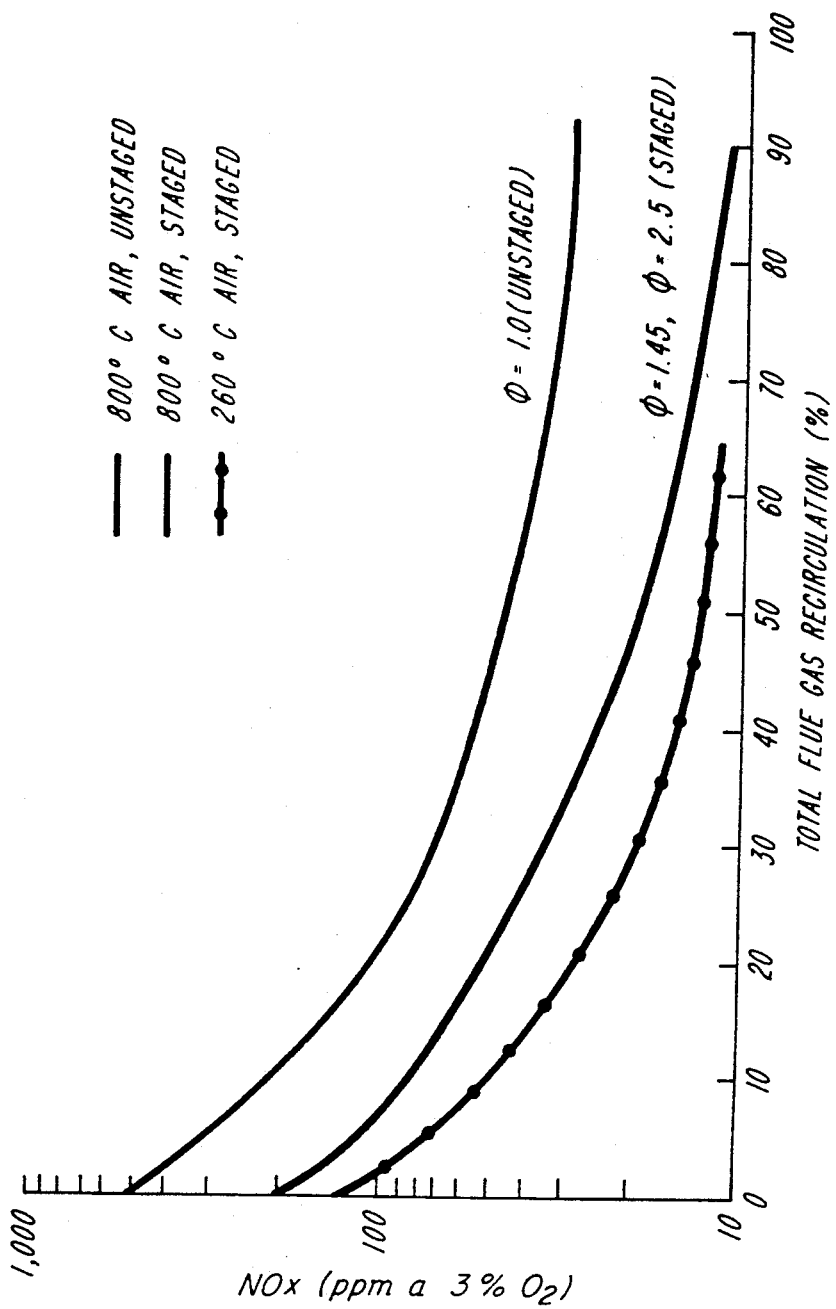
FIG. 6 is a graph of NO$_x$ emissions vs. total flue gas recirculation for a burner according to the present invention.

FIG. 5 is a graph of $NO_x$ emissions vs. primary zone fuel equivalence ratio for a burner according to the present invention using combustion air preheated to 800° C. and recirculated flue gas at 700° C. At low flue gas recirculation rates, staging the combustion air significantly reduced $NO_x$ emissions. For example, with no air staging and 16% flue gas recirculation, the $NO_x$ emission level was approximately 150 ppm. However, with the same flue gas recirculation rate of 16%, and a fuel equivalence ratio in the primary combustion zone of 1.5, corresponding to approximately 66% primary air, the $NO_x$ emission level was 80 ppm. With a fuel equivalence ratio in the primary combustion zone further increased to 2.0, corresponding to approximately 50% primary air, the $NO_x$ emission level was less than 60 ppm. On the other hand, with no air staging ($\Phi=0.94$), $NO_x$ emission level was reduced from 150 ppm to 35 ppm by increasing the flue gas recirculation from 16% to 45%. Thus, flue gas recirculation and air staging can be used to significantly reduce $NO_x$ emissions. With greater flue gas recirculation rates, air staging continued to contribute to the reduction of $NO_x$ emissions, but at flue gas recirculation rates in excess of 45 to 50%, the contribution from air staging was not as significant as at the lower flue gas recirculation rates.

A comparison of the results of staged air versus unstaged air is shown in FIG. 6, which is taken from the data shown in FIGS. 4 and 5. This figure illustrates a curve for $NO_x$ emissions with unstaged air, $\Phi=1.0$, at an air temperature of 800° C. and a curve for $NO_x$ emissions with staged air at both $\Phi=1.45$ and $\Phi=2.5$, at an air temperature of 800° C. As is shown, at a low flue gas recirculation rate of 10% and a preheated air temperature of 800° C., staging the combustion air with $\Phi=1.45$ and $\Phi=2.5$ reduced $NO_x$ emissions from 200 ppm to less than 100 ppm. FIG. 6 also shows the $NO_x$ emissions using staged and unstaged air at a combustion air temperature of 260° C. At this air temperature, little difference in $NO_x$ production was observed due to air staging.

The burner of the present invention was compared to a prior art commercially available burner, a TRANSJET burner. The TRANSJET burner was chosen since it represents a state of the art commercially available low $NO_x$ burner capable of operating with preheated combustion air. Both burners were fired at the rate of 2.51 million BTU/hr (735 kW). The test results of this comparison are shown in Tables 1 and 2 and in FIGS. 7, 8, and 9.

TABLE 1

| | FLAME TEMPERATURE AND EMISSIONS | | | | | | | |
|---|---|---|---|---|---|---|---|---|
| Axial | Present Invention | | | | Prior Art Burner | | | |
| Dist (m) | Temp (°C.) | $O_2$ % | CO % | $NO_x$ ppm | Temp (°C.) | $O_2$ % | CO % | $NO_x$ ppm |
| 0.00 | 1295 | 4.2 | 2.2 | 20 | | | | |
| 0.14 | 1400 | 3.0 | 2.2 | 22 | 1444 | 0.7 | 9.2 | |
| 0.29 | 1360 | 3.5 | 1.4 | 22 | 1593 | 0.4 | 10.5 | |
| 0.47 | 1365 | 4.0 | .8 | 26 | 1681 | 0.3 | 8.2 | |
| 0.62 | 1390 | | | | | | | |
| 0.78 | 1410 | 3.2 | .33 | 33 | | | | |
| 1.09 | 1420 | 1.8 | .20 | 36 | 1676 | 0.4 | 3.5 | 205 |
| 1.40 | 1406 | 1.8 | .14 | 39 | | | | |
| 1.67 | | | | | 1640 | 0.8 | .4 | 210 |
| 2.28 | 1380 | 1.5 | .0314 | 44 | 1610 | 1.6 | .0336 | 215 |
| 3.20 | 1368 | 2.3 | .0041 | 44 | 1542 | 2.0 | .0065 | 210 |
| 4.42 | 1302 | 1.5 | .0003 | 42 | 1456 | 1.8 | .0065 | 180 |

Figure 7:
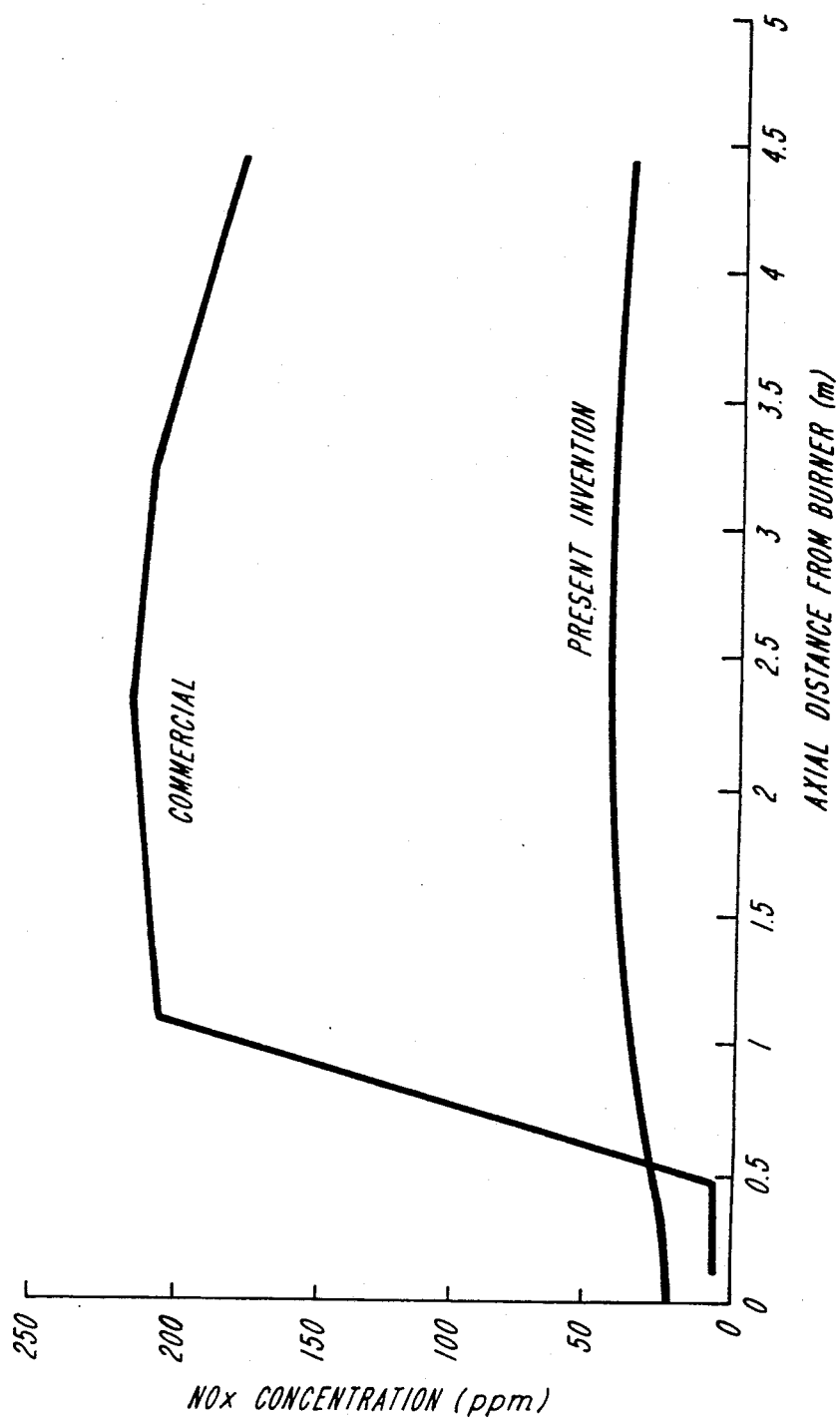
FIG. 7 is a graphical comparison of a burner according to the present invention and a commercial prior art burner showing NO$_x$ concentration along the axis of the burners.

Table 1 and FIG. 7 present $NO_x$ concentration per axial distance from the burner exit. The $NO_x$ concentration remained lower for the burner of the present invention than that of the prior art burner. $NO_x$ emissions from the burner of the present invention ranged from 24 to 45 ppm, while $NO_x$ emissions for the prior art burner ranged from 160 to over 200 ppm.

Figure 8:
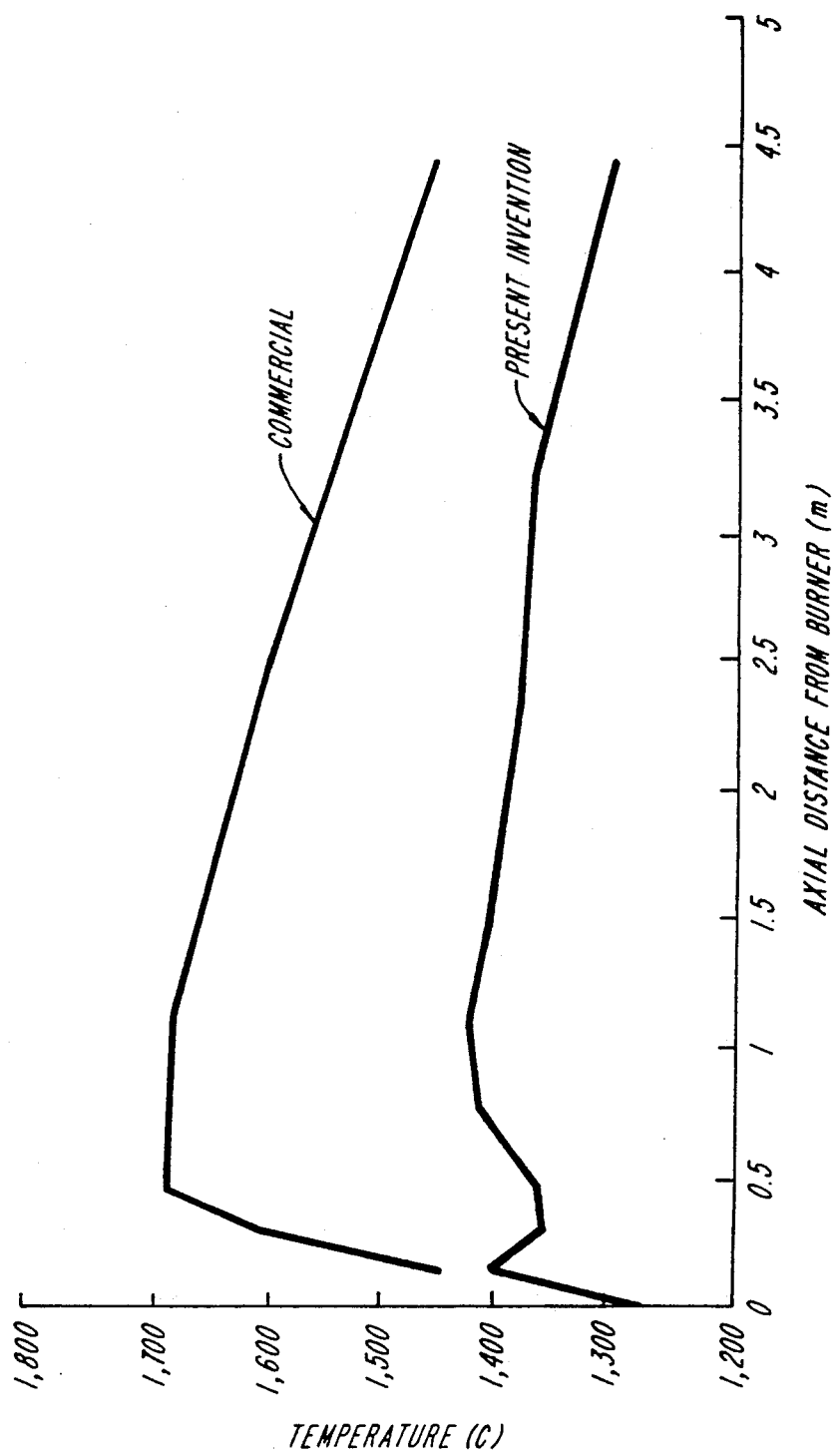
FIG. 8 is a graphical comparison of a burner according to the present invention and a commercial prior art burner showing temperature along the axis of the burners.

Table 1 and FIG. 8 present the temperature vs. axial distance from the burner exit. As can be seen, the temperature remained lower for the burner of the present invention. Also, the temperature at the exit of the primary combustion zone is about 1300° C., rising to a peak of only about 1400° C. in the secondary combustion zone. These temperatures are below the threshold temperatures at which $NO_x$ formation becomes significant. The narrow, pencil-like shape of the prior art burner produced higher flame temperatures and $NO_x$. FIG. 8 also shows that the temperature for the burner of the present invention is relatively uniform, with an absence of hot spots, which also contributes to low $NO_x$ emissions. Further, a uniform flame temperature is important in many industrial heating applications, such as forging or reheating.

TABLE 2

| | HEAT EXTRACTION | | | |
|---|---|---|---|---|
| Axial | Present Invention | | Prior Art Burner | |
| Distance (m) | Heat (kW) | Flux (kW/m$^2$) | Heat (kW) | Flux (kW/m$^2$) |
| 0.000 | 7.90 | 5.40 | 7.36 | 5.03 |
| 0.152 | 23.53 | 16.09 | 17.45 | 11.93 |
| 0.457 | 23.93 | 16.36 | 21.10 | 14.42 |
| 0.762 | 23.23 | 15.88 | 19.52 | 13.34 |
| 1.067 | 8.50 | 5.81 | 9.56 | 6.53 |
| 1.372 | 9.00 | 6.15 | 10.12 | 6.92 |
| 1.676 | 5.10 | 3.49 | 7.29 | 4.98 |
| 1.981 | 8.60 | 5.88 | 8.42 | 5.76 |
| 2.286 | 8.90 | 6.08 | 8.59 | 5.87 |
| 2.591 | 8.60 | 5.88 | 8.42 | 5.76 |
| 2.896 | 7.70 | 5.26 | 5.90 | 4.03 |
| 3.200 | 5.50 | 3.76 | 12.13 | 8.29 |
| 3.505 | 4.30 | 2.94 | 7.95 | 5.43 |
| 3.810 | 9.10 | 6.22 | 6.69 | 4.57 |
| 4.115 | 10.20 | 6.97 | 11.22 | 7.67 |
| 4.420 | 7.30 | 4.99 | 5.43 | 3.71 |
| 4.572 | 7.30 | 4.99 | 4.60 | 3.14 |
| TOTAL | 178.70 | | 171.75 | |

Figure 9:
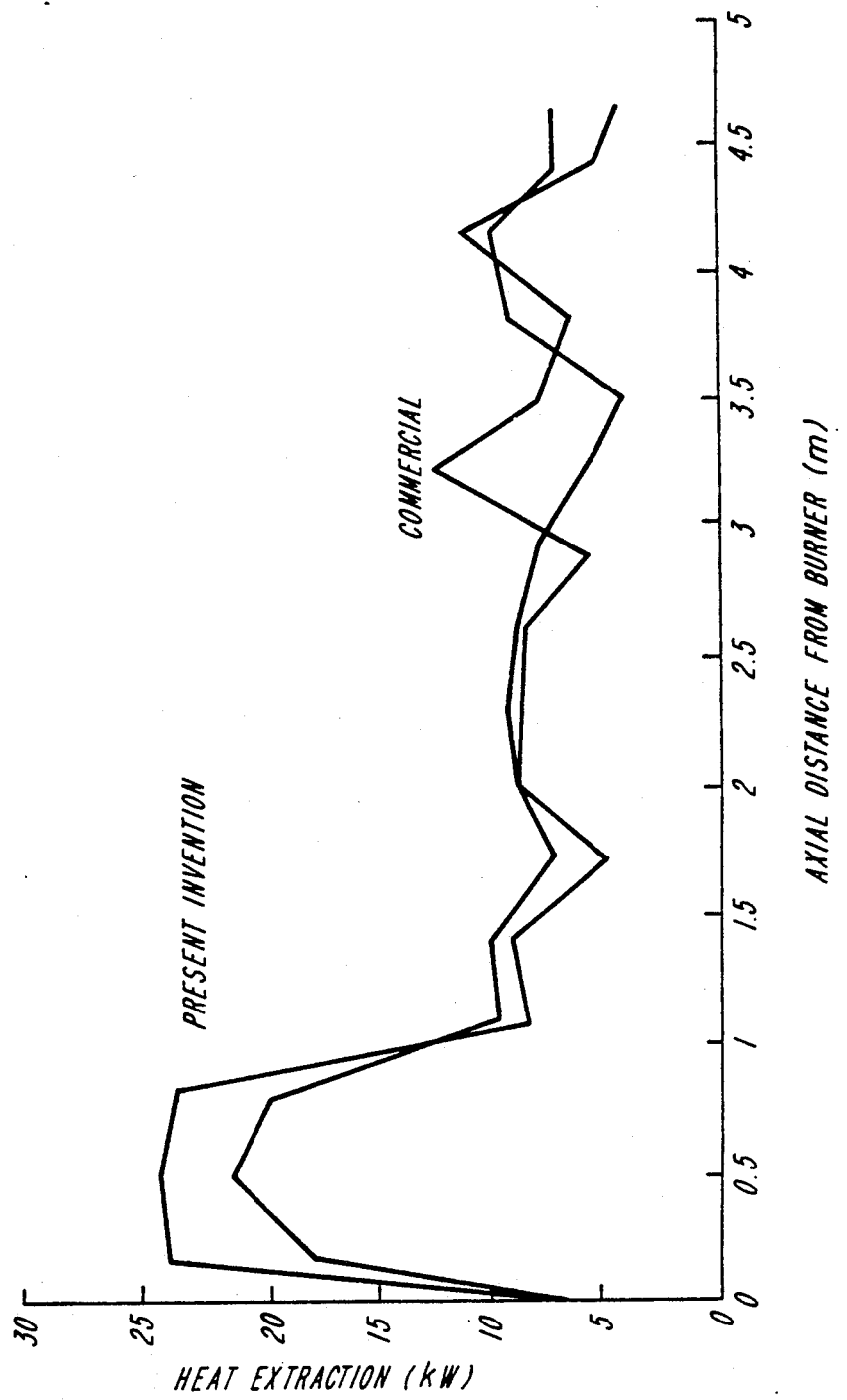
FIG. 9 is a graphical comparison of a burner according to the present invention and a commercial prior art burner showing heat extraction along the axis of the burners.

Table 2 and FIG. 9 present heat extraction to the furnace wall per axial distance from the burner exit. Heat extraction using the burner of the present invention remained competitive with heat extraction using the prior art burner: 178 kW for the present invention, 172 kW for the prior art burner.

It appears that in the prior art burner, the combustion process commences at the burner exit. Rapid burning results, which, for the pencil-like geometry of the flame of the prior art burner, leads to a rapid temperature increase of the flame. The temperature increase leads to a jump in the thermal $NO_x$ level to over 200 ppm. In the burner of the present invention, in contrast, the combustion process begins in the diffusing section of the burner. A more uniform temperature is maintained throughout the flame.

Figure 11:
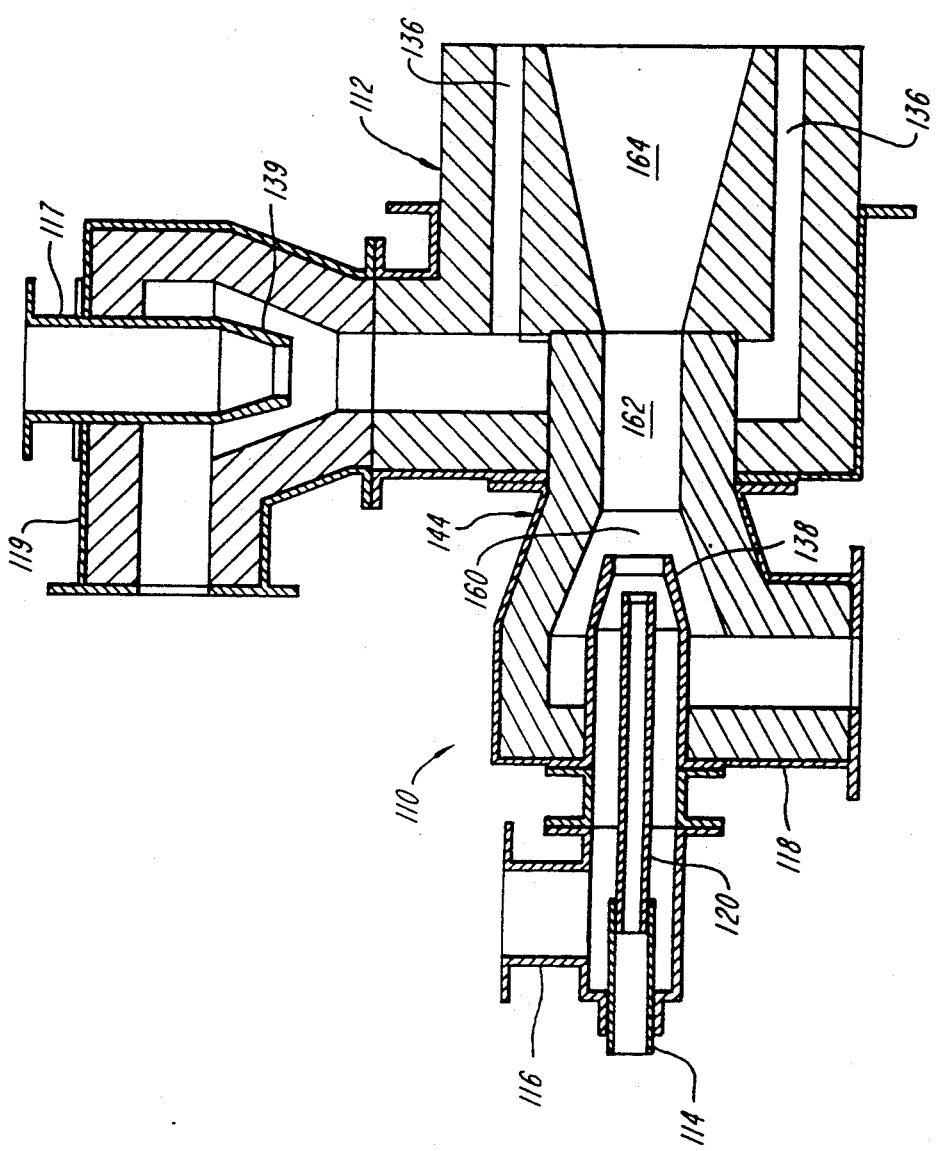
FIG. 11 is a cross-sectional view of an alternative embodiment of a burner according to the present invention.

An alternative embodiment of the present invention is shown in FIG. 11. In this embodiment, flue gas is also recirculated into the secondary combustion zone with the secondary air. The burner 110 comprises a housing 112, a gaseous fuel connection 114, a primary air inlet connection 116, and a primary recirculating flue gas connection 118. A primary air nozzle 138 extends into the housing 112. A fuel inlet nozzle 120 extends from the fuel connection 114 into the housing 112 within the air nozzle 138. A jet pump 144 is formed within the housing 112. The jet pump comprises a suction chamber 160, a cylindrical mixing chamber 162, and a frustoconical diffuser 164. The primary air and fuel supplied under pressure and passing through the nozzle 138 creates a suction which pulls in the primary flue gas. The diffuser 64 serves as the primary combustion chamber.

A secondary air inlet 117 and nozzle 139 are also provided on the housing 112. A secondary recirculating flue gas connection 119 is provided adjacent to the secondary air inlet 117. The secondary air inlet 117 and secondary flue gas inlet communicate with a plurality of annularly spaced passages 136 spaced about the diffuser 164. The passages 136 introduce the secondary air and flue gas into the secondary combustion zone in the furnace.

Figure 12:
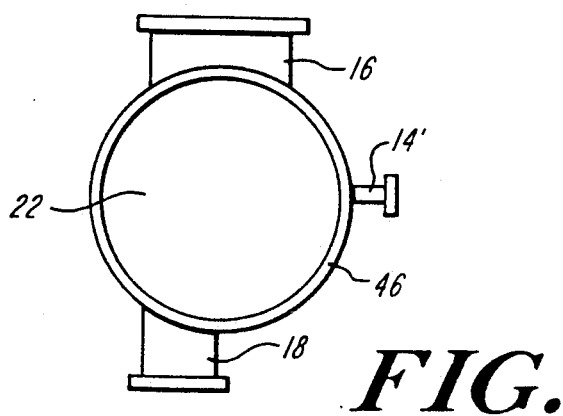
FIG. 12 is an end view of a further embodiment of a burner similar to FIG. 1 illustrating a radial fuel injection port.
Figure 13:
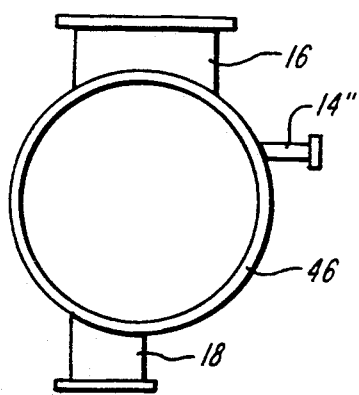
FIG. 13 is an end view of a still further embodiment of a burner similar to FIG. 1 illustrating a tangential fuel injection port.

The burner has been described in conjunction with gaseous fuels. Axial injection of the gaseous fuel, as shown in FIG. 1, is preferable, although radial or tangential injection may be provided if desired. Radial or tangential injection ports 14', 14" respectively may be provided in the suction chamber or mixing chamber as shown in FIGS. 12 and 13. The burner may also be configured for liquid fuels, although such fuels must first be vaporized. The fuels may be vaporized by mixing with the flue gas, for example, as shown in U.S. Pat. No. 3,990,831. The vaporized fuel may then be drawn into the air stream by the air driven jet pump along with the flue gas.

The invention is not to be limited by what has been particularly shown and described, except as indicated in the appended claims.

We claim:

1. A gas-fired burner comprising:
   a housing adapted to be mounted to an opening in a furnace;
   a jet pump within said housing, comprising:
     means forming a suction chamber;
     means forming a mixing chamber downstream from said suction chamber; and
     means forming a diffuser downstream from said mixing chamber, said diffuser having an exit for communication with the furnace, said diffuser further comprising a combustion chamber for primary zone partial combustion;
   an air inlet port on said housing for supplying air under pressure to said housing;
   means forming a primary air passage within said housing interconnecting said air inlet port and said suction chamber, said primary air passage terminating in a jet pump air nozzle for forcing air into said suction chamber;
   means forming a plurality of secondary air passages within said housing connected to said air inlet port, each secondary air passage having an exit for communication with the furnace, said exits being spaced in a circumferential pattern about the diffuser exit;
   means forming a fuel inlet port on said housing and terminating in a fuel nozzle for directing fuel into said jet pump; and
   means forming a recirculating flue gas inlet port on said housing for directing flue gases from the furnace into said suction chamber;
   whereby air under pressure passing through said primary air passage and said air nozzle and fuel gas under pressure passing through said fuel nozzle create a suction for drawing recirculating flue gas through said suction chamber and into said mixing chamber for mixing with the air and fuel to provide a fuel-rich combustion zone in said diffuser, and whereby air under pressure passing through said secondary air passages mixes at high velocity with the primary flame extending from said diffuser to produce a fuel-lean combustion zone in the furnace, thereby reducing $NO_x$ content.

2. The burner of claim 1 wherein said fuel nozzle is coaxially mounted within said jet pump air nozzle.

3. The burner of claim 1 wherein said fuel nozzle is radially mounted to said suction chamber.

4. The burner of claim 1 wherein said fuel nozzle is radially mounted to said mixing chamber.

5. The burner of claim 1 wherein said fuel nozzle is tangentially mounted to said suction chamber.

6. The burner of claim 1 wherein said fuel nozzle is tangentially mounted to said mixing chamber.

7. The burner of claim 1 wherein said means forming said primary air passage includes an annular chamber.

8. The burner of claim 1 wherein said secondary air passages exit and said diffuser exit terminate flush with an exterior wall of said housing, said exterior wall adapted to be located adjacent an interior wall of the furnace.

9. The burner of claim 1 wherein said secondary air passages exits are angled radially inward to direct a secondary air stream into the combustion zone within the furnace.

10. The burner of claim 9 wherein said secondary air passages exits are angled radially inward at an angle between 0° and 60° with respect to the burner longitudinal axis.

11. The burner of claim 1 wherein said secondary air passages exits are sized to produce an exit velocity of the secondary air of between 50 and 300 actual feet per second.

12. The burner of claim 11 wherein said secondary air passages exits are sized to produce an exit velocity of the secondary air of between 150 and 200 actual feet per second.

13. The burner of claim 1 further comprising nozzle inserts within each secondary air passage exit for angling said exits radially inward to direct a secondary air stream into the combustion zone within the furnace.

14. The burner of claim 13 wherein said nozzle inserts are sized to produce an exit velocity of the secondary air of between 50 and 300 actual feet per second.

15. The burner of claim 14 wherein said nozzle inserts are sized to produce an exit velocity of the secondary air of between 150 and 200 actual feet per second.

16. The burner of claim 1 wherein said primary air passage and said air nozzle and said secondary air passages are sized to direct at least 40 percent of the total combustion air through said primary air passage and said air nozzle.

17. The burner of claim 1 further comprising a pilot light tube extending through said housing to said diffuser to ignite an air/fuel mixture within said diffuser.

18. The burner of claim 1 wherein said recirculating flue gas inlet port is mounted to direct flue gas tangentially into said suction chamber to produce a swirling motion of the flue gas.

19. The burner of claim 1 wherein said recirculating flue gas inlet port is mounted to direct flue gas radially into said suction chamber to produce a non-swirling motion of the flue gas.

20. The burner of claim 1 wherein said jet pump air nozzle is sized to produce a pressure drop of 6 to 40 inches of water column.

21. The burner of claim 1 wherein said jet pump air nozzle is sized to produce a pressure drop of 6 to 24 inches of water column.

22. The burner of claim 1 wherein said jet pump air nozzle is sized to produce a pressure drop therethrough sufficient to draw in between 5 and 80 percent flue gas.

23. The burner of claim 1 wherein said jet pump section includes mounting members for mounting said housing to the furnace.

24. A burner for mounting to an opening in a high temperature furnace comprising:
   a housing having a mounting member for mounting adjacent to an opening in the furnace;
   means forming a suction chamber within said housing;
   means forming a mixing chamber within said housing downstream from said suction chamber;
   means forming a diffuser within said housing downstream from said mixing chamber, said diffuser having an exit for communication with the furnace via the opening in the furnace, said diffuser further comprising a combustion chamber for primary zone combustion;
   a primary air inlet port on said housing for supplying air under pressure to said housing;
   means forming a primary air passage within said housing interconnecting said air inlet port and said suction chamber, said primary air passage terminating in an air nozzle for forcing air into said suction chamber;
   a secondary air inlet port on said housing for supplying air to said housing;
   means forming a secondary air passages within said housing connected to said secondary air inlet port, each secondary air passage having an exit for communication with the furnace adjacent to the exit of the diffuser;
   a fuel inlet port on said housing and connected with a fuel nozzle for directing fuel into said suction chamber; and
   a recirculating flue gas inlet port on said housing connected with passage means for directing flue gases from the furnace into said suction chamber.

25. The burner of claim 24 further comprising a second recirculating flue gas inlet port on said housing including means for directing flue gases from the furnace into said secondary air passages.

26. A method of burning gaseous fuel for high temperature applications comprising the steps of:
   providing air under pressure which has been preheated to at least 300° C.;
   introducing the air into a burner housing;
   dividing the air within the housing into a primary air stream and a secondary air stream;
   introducing the primary air stream through a nozzle into a suction chamber;
   using the air flowing through the suction chamber to draw into the suction chamber flue gas recirculating from a furnace into a mixing chamber in which the air and fuel mix to form a fuel-rich combustible mixture;
   introducing the fuel-rich combustible mixture into and through a diffuser attached to the furnace to raise the pressure of the mixture up to the pressure in the furnace for introduction of the mixture to the furnace and burning said fuel-rich combustible mixture in the diffuser and furnace to form a fuel-rich combustion zone generally within and immediately outside the diffuser; and
   introducing the secondary air stream into the furnace to penetrate the flame extending from the diffuser to provide a fuel-lean combustion zone within the furnace.

27. The method of claim 26 further comprising the step of drawing the recirculating flue gas into the suction chamber tangentially to the suction chamber to create a swirling motion.

28. The method of claim 26 wherein at least 40 percent of the combustion air is divided into the primary air stream.

29. The method of claim 26 further comprising dividing the secondary air stream into a plurality of air streams circumferentially spaced about the fuel-lean combustion zone.

30. The method of claim 29 further comprising directing the plurality of secondary air streams radially inward toward the fuel-lean combustion zone in the furnace.

31. The method of claim 26 further comprising introducing a further stream of recirculating flue gas into the secondary air stream.

* * * * *